(12) United States Patent
Costello (10) Patent No.: US 10,360,599 B2
(45) Date of Patent: Jul. 23, 2019

(54) TRACKING OF MEMBERS WITHIN A GROUP

(71) Applicant: NCR Corporation, Duluth, GA (US)

(72) Inventor: Christopher John Costello, Suwanee, GA (US)

(73) Assignee: NCR Corporation, Atlanta, GA (US)

(*) Notice: Subject to any disclaimer, the term of this patent is extended or adjusted under 35 U.S.C. 154(b) by 21 days.

(21) Appl. No.: 15/691,370

(22) Filed: Aug. 30, 2017

(65) Prior Publication Data

US 2019/0066169 A1    Feb. 28, 2019

(51) Int. Cl.
*G06Q 30/02* (2012.01)
*H04N 7/18* (2006.01)
(Continued)

(52) U.S. Cl.
CPC ......... *G06Q 30/0281* (2013.01); *G06Q 20/18* (2013.01); *G06Q 30/01* (2013.01);
(Continued)

(58) Field of Classification Search
CPC ........... G06K 9/00805; G06K 9/00845; G06K 9/00597; G06K 9/00791; G06K 2209/23; G06K 9/3241; G06K 9/00825; G06K 9/3233; G06K 9/00771; G06K 2209/09; G06K 9/0063; G06K 9/00798; G06K 9/00201; G06K 9/00778; G06K 9/34; G06K 9/6232; G05D 2201/0213; G05D 1/00; G05D 1/0231; G05D 1/0246; G06T 17/00; G06T 17/05; G06T 2207/30252; G06T 7/20; G06T 2207/10016; G06T 2207/30241; G06T 7/246; G06T 7/70; G08G 1/166; G08G 1/0112; G08G 1/0141; G08G 1/054; B60W 40/04; B60W 30/09; B60W 2550/308; B60W 30/02; G01S 13/931; G01S 17/936; G01S 13/62; G01S 13/86; G01S 13/92; G06F 17/30023; G06F 3/0304; G06Q 30/0251; G06Q 30/0254; G06Q 10/0639; G06Q 20/18; G06Q 20/3224; G06Q 30/01; G06Q 30/0281; G06Q 30/0633; H04N 21/4725; H04N 21/47815; H04N 2201/3253; H04N 7/183; H04N 7/181; G02B 2027/014; H04H 60/33; F24F 11/30; F24F 11/64; F24F 11/89; F24F 2110/00; F24F 11/52; F24F 11/62;
(Continued)

(56) References Cited

U.S. PATENT DOCUMENTS

5,935,190 A * 8/1999 Davis ..................... G01S 13/62
340/936
9,285,230 B1 * 3/2016 Silver ................... G01C 21/26
(Continued)

*Primary Examiner* — Aklilu K Woldemariam
(74) *Attorney, Agent, or Firm* — Schwegman, Lundberg & Woessner (57) ABSTRACT

A group of consumers are identified before the members of the group enter a frictionless store on an outside premises of the store. In an embodiment, a registered account holder for a member of the group is passed to an indoor tracking system of the frictionless store when the group enters the store. In an embodiment, attributes of a potential group of consumers is passed to an indoor tracking system when the group enters the store without a registered account being identified.

19 Claims, 4 Drawing Sheets

(51) Int. Cl.
    *G06Q 20/18*     (2012.01)
    *G06Q 50/06*     (2012.01)
    *G06Q 30/00*     (2012.01)
    *G06Q 30/06*     (2012.01)
    *H04L 29/08*     (2006.01)

(52) U.S. Cl.
    CPC ......... *G06Q 30/0633* (2013.01); *G06Q 50/06* (2013.01); *H04N 7/181* (2013.01); *H04L 67/306* (2013.01)

(58) Field of Classification Search
    CPC ....... F24F 2120/10; G05B 2219/34477; G05B 2219/25387; G05B 2219/2642; H04L 12/2825; H04L 67/12; H04L 67/125; H04L 67/306; B60R 2011/004; B60R 1/04; B60Q 1/2665; B61L 25/023; B61L 27/0094; A63B 2220/05
    USPC ..... 382/103; 340/936, 937; 701/23, 28, 119, 701/300
    See application file for complete search history.

(56) References Cited

U.S. PATENT DOCUMENTS

| | | | | |
|---|---|---|---|---|
| 9,952,427 | B2* | 4/2018 | Teller | ................. G06K 9/00604 |
| 2009/0257620 | A1* | 10/2009 | Hicks | .................... G06Q 30/02 382/100 |
| 2013/0095855 | A1* | 4/2013 | Bort | ....................... G06T 17/05 455/456.2 |
| 2013/0127980 | A1* | 5/2013 | Haddick | ................ G06F 3/013 348/14.08 |
| 2013/0346302 | A1* | 12/2013 | Purves | ................ G06Q 20/102 705/40 |
| 2014/0236414 | A1* | 8/2014 | Droz | ...................... G08G 1/161 701/28 |
| 2014/0266644 | A1* | 9/2014 | Heubel | ................ G06F 3/0421 340/407.1 |
| 2014/0304157 | A1* | 10/2014 | Bachenheimer | ... G06Q 20/4016 705/44 |
| 2014/0331136 | A1* | 11/2014 | Desmons | ........... G06F 16/9537 715/719 |
| 2015/0127174 | A1* | 5/2015 | Quam | ..................... F24F 11/63 700/276 |
| 2015/0310365 | A1* | 10/2015 | Li | ...................... G06Q 10/0639 705/7.38 |
| 2016/0357187 | A1* | 12/2016 | Ansari | ................. G01S 15/931 |
| 2016/0357188 | A1* | 12/2016 | Ansari | ................. G05D 1/0212 |
| 2016/0358477 | A1* | 12/2016 | Ansari | ................. G08G 1/167 |
| 2017/0221289 | A1* | 8/2017 | Trani | ................. G07C 9/00158 |
| 2017/0323481 | A1* | 11/2017 | Tran | ...................... G06T 19/006 |

\* cited by examiner

TRACKING OF MEMBERS WITHIN A GROUP

BACKGROUND

A variety of mobile-based services exist in the industry for users and businesses to: obtain information, perform transactions, watch entertainment, and socialize with business associates, friends, and family members.

Enterprises have been leveraging the environment to provide a variety of automated services to consumers. One recent development, is a frictionless store in which a consumer can enter a store and shop without ever accessing any electronic device and without interacting with a clerk to checkout of the store with purchased items.

One problem with the frictionless store is when a consumer is associated with a group and members of that group are shopping with the consumer. The existing technology is challenged when distinguishing between what items taken by members of the group belong to a single member of the group (even when items are taken by multiple members) and what items belong to a specific individual independent of the group.

The problem becomes conflated at or near the physical entrance of the store where consumers are first identified. The entrance often becomes congested with people coming into the store or leaving the store, which makes it difficult to distinguish between individuals within a group and groups associated with a single individual.

To date, the issue has been alleviated by forcing individuals to identify themselves or group affiliation through some electronic manual interaction with the individuals as they enter or check-in to a frictionless store. However, this defeats the very purposes of the frictionless store in that it requires affirmative actions to be taken by consumers to distinguish individuals from groups.

SUMMARY

In various embodiments, methods and a system for tracking members within a group are presented.

According to an embodiment, a method for tracking members within a group is presented. More particularly, a potential group of consumers for a frictionless store are identified as a plurality of individuals on a premises of the frictionless store before any individual of the potential group enters the frictionless store through at least some video tracking and imaging tracking processing. Attributes for the potential group and each individual are provided to an indoor tracking system when at least one individual of the group is detected as entering the frictionless store.

DETAILED DESCRIPTION

Figure 1:
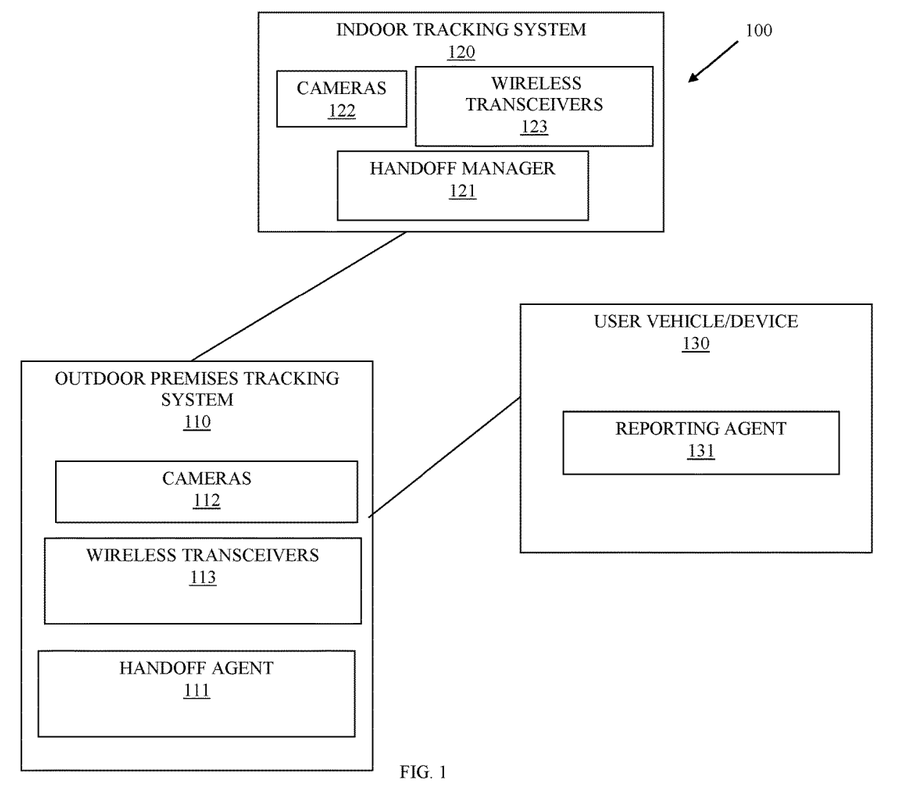
FIG. 1 is a diagram of a system for tracking members within a group, according to an example embodiment.

FIG. 1 is a diagram of a system 100 for tracking members within a group, according to an example embodiment. The various components are illustrated and the arrangement of the components is presented for purposes of illustration only. It is to be noted that other arrangements with more or less components are possible without departing from the tracking members within a group teachings presented herein and below.

The techniques, methods, and system presented herein and below for tracking members within a group can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

A significant issue in the industry associated with assigning people to a group within a frictionless store when entering the store is the entry/exit way is small and can quickly become crowded. A conventional indoor tracking system will have difficulty figuring out whom to assign to an account that is to be checked-in to the store. As discussed herein and below the system 100, in one embodiment, transfers the group assignment to a far less crowded area, such as the parking lot. As will be demonstrated, by combining multiple cooperating components 110-130 all groups can be sufficiently accounted for that enter the store.

The system 100 includes: a) an outdoor premises tracking system having a plurality of camera 112, wireless transceivers 113, and a handoff agent 111; b) an indoor tracking system 120 having a plurality of camera 122, wireless transceivers 120, and a handoff manager 121; and, optionally, c) a user vehicle/device 130 having a reporting agent 130. The interaction and processing of these components will now be discussed with reference to method presented in the FIG. 1.

The outdoor premises tracking system 110 uses a variety of cameras 112, wireless transceivers 113 (such as wireless beacons, Bluetooth®, and/or Wi-Fi), and/or sensors to identify groups and assign a retail account for at least one member of a given identified group through the handoff agent 111.

The indoor tracking system 120 uses a variety of cameras 122, wireless transceivers 123, and/or sensors to track items purchased within a store, assign the items to an account, complete a purchase for the items, and check-out the account from the store. A conventional indoor tracking system 120 is enhanced with the handoff manager 121, which interacts with the handoff agent 111 of the outdoor premises tracking system 110, providing the indoor tracking system 120.

In an embodiment, the handoff manager 121 is enhanced with in-store group tracking independent of the outdoor premises tracking system 110 as discussed in some embodiments herein and below.

In some embodiments, the system 100 also includes a user vehicle/device 130 configured with a reporting agent 131. The reporting agent 131 is configured to identify a wireless transceiver 113 of the outdoor premises tracking system 110 and check-in or identify a specific consumer associated with a registered account of the frictionless store and/or identifies a number of individuals present in a vehicle of a specific user. The reporting agent 131 then reports the specific user account and/or the number of individuals present in the vehicle 130 to the handoff agent 111 through one of the wireless transceivers 113 when the vehicle 130 is within a communication range of those wireless transceivers 113.

In an embodiment, the reporting agent 131 is a mobile application that executes on a mobile device 130 of the user (such as a wearable processing device, tablet, laptop, and/or phone.

In an embodiment, the reporting agent 131 is integrated into a processing unit as an application that executes on the integrated processing unit of a vehicle 130. In an embodiment, the reporting agent 131 is an application that processes on a device 130 that is part of the Internet-of-Things (IoTs) and the device is attached or affixed to a vehicle.

The various embodiments of the system 100 is now discussed with operational scenarios for group tracking and identification.

Consider a consumer X that registers his vehicle 130 with the frictionless store for linking to X's account with the store. The outdoor premises tracking system can then identify the presence of the user in the parking lot of the store through a variety of mechanisms, such as: reading the vehicle's license plate by the cameras 112 in cooperation with image processing, identifying the make, color, and model of the vehicle 130 by the cameras 112 in cooperation with image processing, and/or through wireless identification reported by a reporting agent 131 affixed in the vehicle 130, integrated into the processing unit of the vehicle 130, and/or processing as an application on a mobile device 130 carried by the user.

The handoff agent 111 utilizing image processing and the cameras 112 and/or wireless transceivers 113 or sensors identifies X and X's account within the parking lot and identifies when people exist the vehicle 130. Attributes associated with images of each individual existing the vehicle are computed, such as height, apparel color, apparel items, and the like. X is identified by registered attributes linked to the account of X, such as biometric information (facial features) and other attributes (sex, ethnicity, height, etc.).

Each person that exists the vehicle is initially tracked through their discovered attributes with X through video tracking techniques. As the group is detected by the cameras as entering the store, the handoff agent provides X and the X's account and the attributes for each member of the group that is with X to the handoff manager 121 where the indoor tracking system monitors X and each member of the group while inside the store. Each item picked up an retained while in the store are provisionally assigned as being an item for purchase by X through X's registered payment method with the store. However, the items are also provisionally assigned to each specific member of the group being tracked as individuals within the store, such that should X exit the store first, X is alerted about the other items, and any member of the group having unpurchased items that attempts the exit the store with the items will generate an alert notification at the exist (egress) point of the store for security to investigate.

In another embodiment, the frictionless store includes purchase areas that are outdoors and indoors (such as a convenience store that sells fuel, a grocery store having fuel pumps, etc.). Here, the handoff agent 111 utilizes the cameras 112, fuel pump sensors, and/or transceivers to identify purchased items by X and members of X's identified group and provides pending information to the indoor tracking system 120 and/or receives pending tracking information from the indoor tracking system 120 through the handoff manager 121. In an embodiment, the frictionless store is completely outdoors, such as a gas station with or without item kiosks.

This system 100 permits frictionless stores to account for individuals arriving by vehicle 130 and removes the conventional need for individuals to manually check-in when entering the store, since customer identification and account linking can be done before the customer enters the store.

In an embodiment, identification of customers to a group can be achieved by the system 100 arriving at the store on foot or in different vehicles from one another. Here, the group is identified through the overhead cameras 112 when they enter the field of view (FOV) of the cameras 112. People tracking algorithms are processed by the handoff agent 111 with respect to the potential members of the group based on detected interactions between the members, proximity of the members to one another. When a potential group is identified based on the people tracking algorithms, the number of members in the group, and the visual attributes of each member are passed from the handoff agent 111 to the handoff manager 121 when the group enters the store (ingress point). When the account owner checks-in to the store using a conventional frictionless check-in mechanism (scan a bar code, place face or hand/finger in front of a biometric reader), the attributes assigned to a member of the group associated with the account owner are linked to the account owner and the other members are tracked while within the store as being associated with the account of the account owner that checked in. The account owner is also sent a message to have confirm that the other potential members are to be associated with the identified group. If the account owner declines the group, a message can be displayed on a digital display or communicated to a registered mobile device of the account owner that instructs the other members of the group to check-in or to purchase items through checkout stations within the store. If the group designation is declined by the checked-in account owner, then each individual is separately tracked while shopping within the store.

When an anonymously tracked group fails to have any member check-in to the store, the members are tracked by the indoor tracking system 120 as a group and as individuals. When a first member of the anonymous group checks out of a Self-Service Checkout (SCO) station, the first member to check out is asked if he/she wants to pay for all items of the group or just those items in the possession of that first member. In this way, a group of individuals, such as a family can still utilize the group designation and check out together even when different members of the family have different items and no member of the family is registered with the frictionless store.

In an embodiment, the handoff agent 111 may not have been able to identify a potential anonymous group upon entry into the store. In such case, the handoff agent 111 may identify that the members of the group are potentially a group to the handoff manager 121. The handoff manager 121 may utilize the people tracking algorithms within the store to continue evaluation as to whether the members are part of a group (through interactions within the store (using a same shopping cart, handing items to one another, talking to one another, etc.), time of members spent together in specific locations within the store, and proximity of members to one another while in the store, etc. This also allows for the first member at checkout with a SCO station to elect to pay for all items possessed by the group while continuing to track each member of the group as separate consumers.

The system 100 permits a frictionless store functionality to be extended to groups of consumers, extended to anonymous groups for SCO as a group, extended to outdoor stores, and extended to both indoor and outdoor stores. This is achieved through account owner identification before a group associated with the account owner enters a frictionless store and/or through identifying or potentially identifying an anonymous group of consumers as a single group before an account owner checks in to the frictionless store.

These and other embodiments are now discussed with reference to the FIGS. 2-4.

Figure 2:
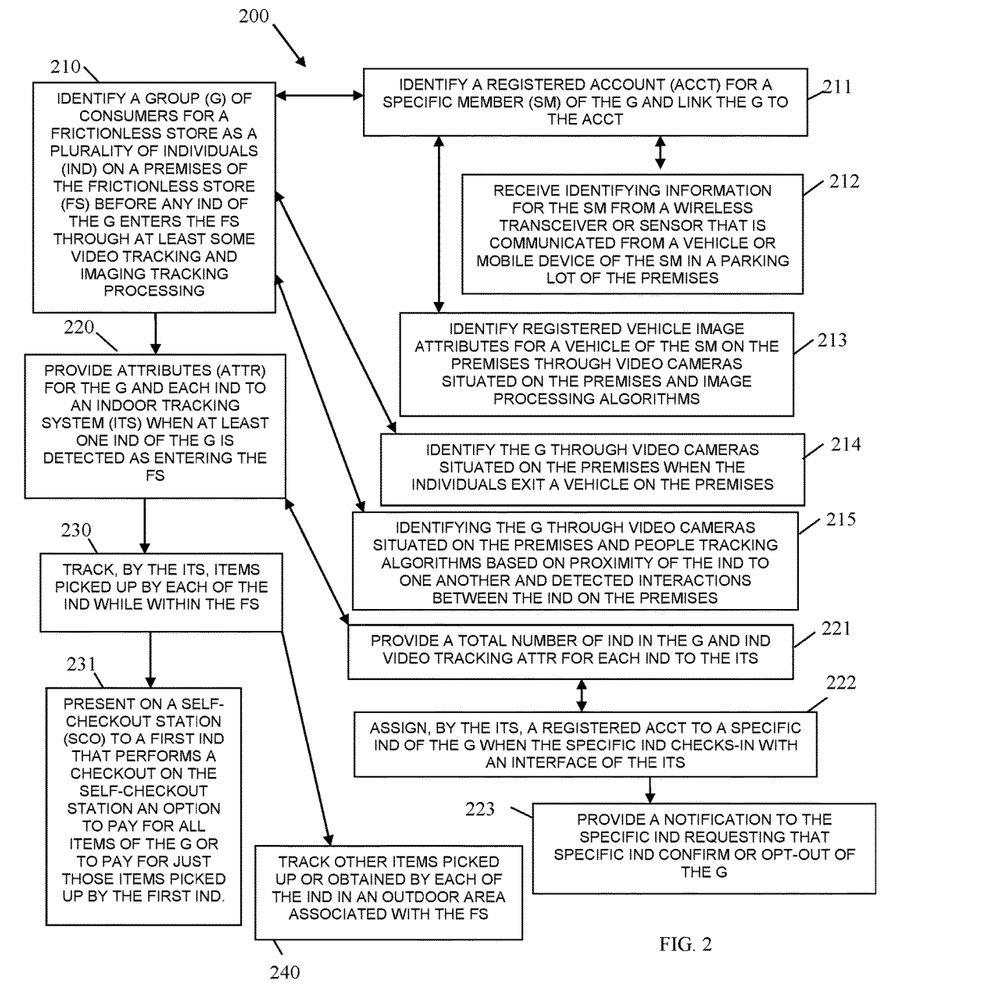
FIG. 2 is a diagram of a method for tracking members within a group, according to an example embodiment.

FIG. 2 is a diagram of a method 200 for tracking members within a group, according to an example embodiment. The software module(s) that implements the method 200 is referred to as a "group identification manager." The group identification manager is implemented as executable instructions programmed and residing within memory and/or a non-transitory computer-readable (processor-readable) storage medium and executed by one or more processors of a device. The processor(s) of the device that executes the group identification manager are specifically configured and programmed to process the group identification manager. The group identification manager has access to one or more networks during its processing. The networks can be wired, wireless, or a combination of wired and wireless.

In an embodiment, the group identification manager is all or some combination of the modules 111, 121, and/or 131.

In an embodiment, the device that executes the group identification manager is a server.

In an embodiment, the device that executes the group identification manager is a plurality of servers logically organized as a cloud processing environment.

At 210, the group identification manager identifies a group of consumers for a frictionless store as a plurality of individuals on a premises of the frictionless store before any of the individuals enters the frictionless store through at least some video tracking and image tracking processing.

In an embodiment, the premises includes a parking lot and entry area of the frictionless store.

According to an embodiment, at 211, the group identification manager identifies a registered account for a specific member of the group and links the group to the registered account for items picked up by the individuals while within the frictionless store.

In an embodiment of 211 and at 212, the group identification manager receives identifying information from a wireless transceiver or sensor that is communicated from a vehicle or a mobile device of the specific member in a parking lot of the premises. In an embodiment, the vehicle or device is the vehicle/device 130 that executes the reporting agent 131.

In an embodiment of 211 and at 213, the group identification manager identifies registered vehicle attributes for a vehicle of the specific member on the premises through video cameras situated on the premises and image processing algorithms.

In an embodiment, at 214, the group identification manager identifies the group through video cameras situated on the premises when the individuals exit a vehicle on the premises.

In an embodiment, at 215, the group identification manager identifies the group through video cameras situated on the premises and people tracking algorithms based on proximity of the individuals to one another and detected interactions between the individuals on the premises.

At 220, the group identification manager provides attributes for the group and each individual to an indoor tracking system when at least one individual of the group is detected as entering the frictionless store. The attributes can be any of the image-identified attributes discussed above with the FIG. 1.

According to an embodiment, at 221, the group identification manager provides a total number of individuals in the group and individual video tracking attributes for each individual to the indoor tracking system.

In an embodiment of 221 and at 222, the group identification manager assigns, by the indoor tracking system, a registered account for the frictionless store to a specific individual of the group when the specific individual checks-in with an interface of the frictionless store.

In an embodiment of 222 and at 223, the group identification manager provides a notification to the specific individual requesting that the specific individual confirm or opt-out of the group.

In an embodiment, at 230, the indoor tracking system, tracks items picked up by each individual while within the frictionless store.

In an embodiment, at 231, the indoor tracking system presents on a SCO station to a first individual that performs a checkout on the SCO station an option to pay for all of the items of the group or to pay for just those items picked up by the first individual that performs a SCO at the SCO station.

In an embodiment of 230 and at 240, the group identification manager, tracks other items picked up or obtained by each of the individuals in an outdoor area associated with the frictionless store.

Figure 3:
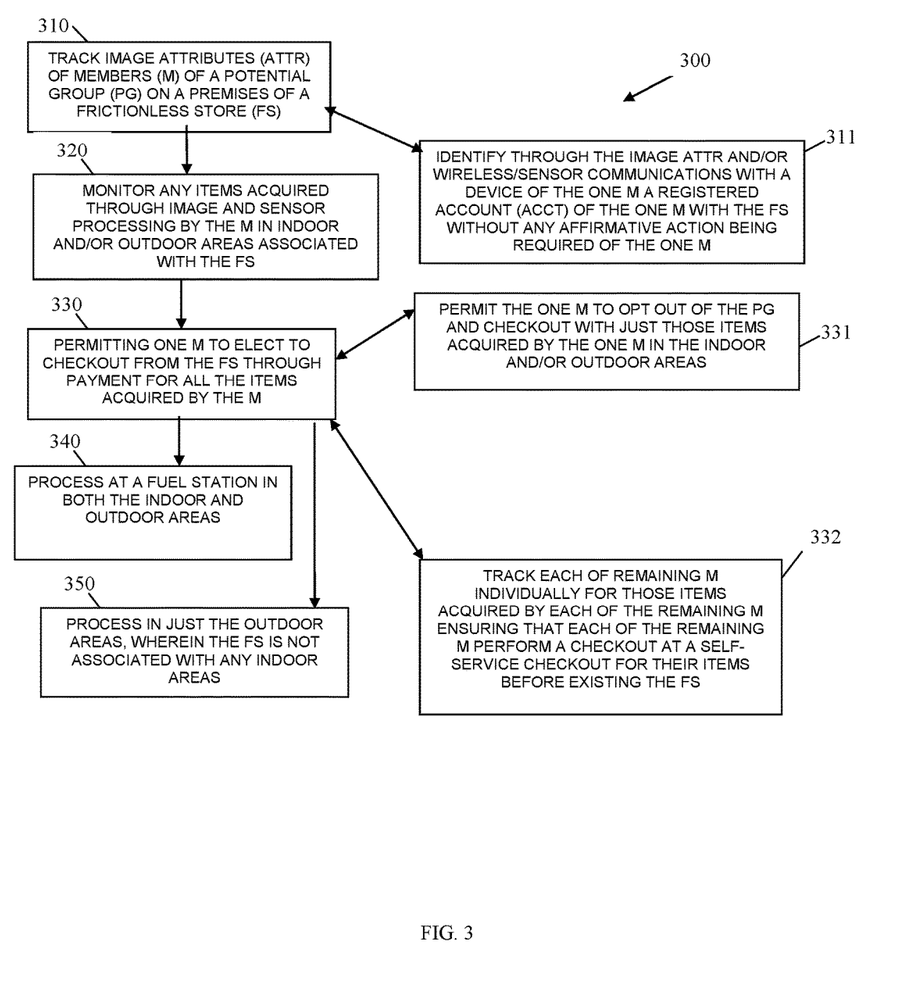
FIG. 3 is a diagram of another method for tracking members within a group, according to an example embodiment.

FIG. 3 is a diagram of another method 300 for tracking members within a group, according to an example embodiment. The software module(s) that implement the method 300 is referred to herein as a "group identification manager." The group identification manager is implemented as executable instructions and programmed within memory and/or a non-transitory computer-readable (processor-readable) storage medium that executes on one or more processors of a device. The processors of the device are specifically configured to execute the group identification manager. The group identification manager has access one or more networks; the networks can be wired, wireless, or a combination of wired and wireless.

In an embodiment, the group identification manager is all or some combination of the modules 111, 121, and/131.

In an embodiment, the device that executes the group identification manager is a server.

In an embodiment, the device that executes the group identification manager is a plurality of servers cooperating as a cloud processing environment.

In an embodiment, the group identification manager presents another and in some ways enhanced perspective of the method 200 of the FIG. 2.

At 310, the group identification manager tracks image attributes of members of a potential group on a premises of a frictionless store.

In an embodiment, at 311, the group identification manager identifies, through image attributes and/or wireless/sensor communications with a device of one member a registered account of the one member with the frictionless store without any affirmative action being required by that one member.

At 320, the group identification manager monitors any items acquired through image and sensor processing by all the members in indoor and/or outdoor areas associated with the frictionless store.

At 330, the group identification manager permits one member to elect to checkout from the frictionless store through payment of all items acquired by the members of the group.

In an embodiment, at 331, the group identification manager permits the one member to opt out of the potential group and checkout with just those items acquired by the one member in the indoor and/or outdoor areas.

In an embodiment, at 332, the group identification manager track each of remaining members individually for those items acquired by each of the remaining members ensuring that each of the remaining members perform a checkout at a SCO station for their items before exiting the frictionless store.

According to an embodiment, at 340, the group identification manager is processed at a fuel station in both the indoor and outdoor areas.

In an embodiment, at 350, the group identification manager is processed in just outdoor areas, where the frictionless store is not associated with any indoor areas.

Figure 4:
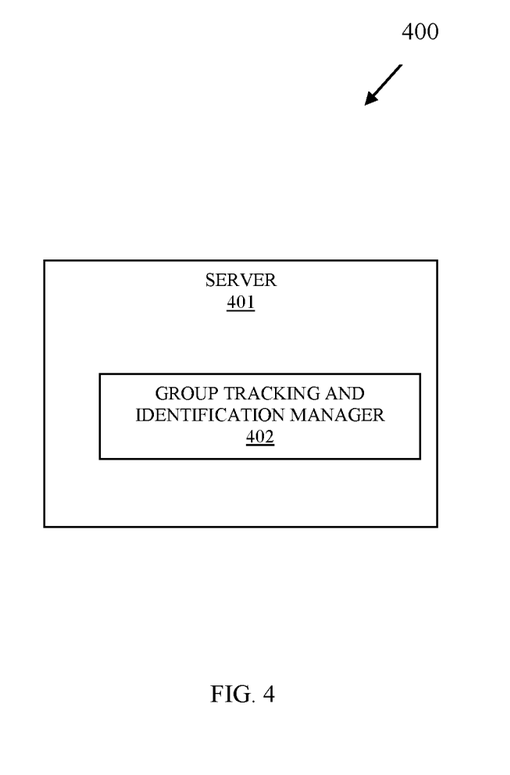
FIG. 4 is a diagram of another system for tracking members within a group, according to an example embodiment.

FIG. 4 is a diagram of another system 400 for tracking members within a group, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programmed to perform the processing discussed above with the FIGS. 1-3.

The system 400 includes a server 401 having a group tracking and identifying manager 402.

In an embodiment, the server 401 is a server.

In an embodiment, the server 401 is a part of a cloud processing environment.

In an embodiment, the group tracking and identification manager 402 is all of or some combination of: the modules 111, 121, 131, the method 200, and/or the method 300.

The group tracking and identification manager 402 executes on the server 401 and is configured to: i) identify members of a group on a premises of a frictionless store, ii) link a registered account to a specific member of the group, and iii) provide image attributes for each member of the group and the group as a whole along with the registered account to an indoor tracking system of the frictionless store.

In an embodiment, the indoor tracking system is the indoor tracking system 120.

In an embodiment, the group tracking and identification manager 402 is further configured, in ii) to identify the specific member based on registered image attributes associated with a vehicle of the specific member that is linked to the registered account or based on wireless information communicated from a device associated with the vehicle or a mobile device of the specific member.

In an embodiment the vehicle and/or device is the vehicle/device 130 that executes the reporting agent 131.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

identifying, by executable instructions that are executed by a hardware processor of a server from a non-transitory computer-readable storage medium, a group of consumers for a frictionless store as a plurality of individuals on an outdoor premises associated with a store before any individual of the group enters an inside of the store by processing at least some video tracking and imaging tracking processing that captures images of the individuals in proximity to one another, assigns the individuals to the group, extracts attributes from the images associated with the group as a whole and each individual of the group, and tracks the consumers as belonging to the group through the images using the attributes before the individuals enter the store, wherein at least a portion of a store includes a frictionless store that allows customers to pick specific items from the frictionless store without scanning the specific items for a checkout at the store, and wherein the attributes include for each individual include: a height of that individual, a color of apparel worn by that individual, facial features of that individual, sex of that individual, and ethnicity of that individual; and providing, by the executable instructions, the attributes that define the group and each individual to an indoor tracking system associated with the frictionless store when at least one individual of the group is detected as entering the inside of the store through the images associated with the outdoor premises, wherein the indoor tracking system picks up tracking of the at least one individual and the group as a whole by analyzing other images received by the indoor tracking system using the attributes and tracking, by the indoor tracking system associations between the group, the individuals, and the specific items through the other images.

2. The method of claim 1, wherein identifying further includes identifying a registered account for a specific member of the group and linking the group to the registered account.

3. The method of claim 2, where identifying the registered account further includes receiving identifying information for the specific member from a wireless transceiver or sensor that is communicated from a vehicle or mobile device of the specific member in a parking lot of the outdoor premises.

4. The method of claim 2, wherein identifying the registered account further includes identifying registered vehicle image attributes for a vehicle of the specific member one the outdoor premises through video cameras situated on the outdoor premises and image processing algorithms.

5. The method of claim 1, wherein identifying further includes identifying the group through video cameras situated on the outdoor premises when the individuals exit a vehicle on the outdoor premises.

6. The method of claim 1, wherein identifying further includes identifying the group through video cameras situated on the outdoor premises and people tracking algorithms based on proximity of the individuals to one another and detected interactions between the individuals on the outdoor premises.

7. The method of claim 1, wherein providing further includes providing a total number of individuals in the group and individual video tracking attributes for each individual to the indoor tracking system.

8. The method of claim 1, wherein providing further includes, assigning, by the indoor tracking system, a registered account to a specific individual of the group when the specific individual checks-in with an interface of the indoor tracking system.

9. The method of claim 8 further comprising, providing, by the executable instructions, a notification to the specific individual requesting that specific individual confirm or opt-out of the group.

10. The method of claim 1 further comprising, tracking, by the indoor tracking system, items picked up by each of the individuals while within the frictionless store.

11. The method of claim 10 further comprising, presenting on a self-checkout station to a first individual that performs a checkout on the self-checkout station an option to pay for all items of the group or to pay for just those items picked up by the first individual.

12. The method of claim 10 further comprising, tracking, by the executable instructions, other items picked up or obtained by each of the individuals in an outdoor area associated with the frictionless store.

13. A method, comprising:
tracking, by executable instructions that are executed on a hardware processor of a server from a non-transitory computer-readable storage medium, image attributes of members of a potential group detected on an outdoor premises of a store by capturing images from cameras and analyzing initial images of the group on the outdoor premises and extracting the image attributes from the initial images for the potential group as a whole and for each member assigned to the group, wherein at least a portion of a store includes a frictionless store that allows customers to pick specific items from the frictionless store without scanning the specific items for a checkout at the store, and wherein the image attributes include for each member include: a height of that member, a color of apparel worn by that member, facial features of that member, sex of that member, and ethnicity of that member;
providing, by the executable instructions, the image attributes for tracking the group and the members to an indoor tracking system when the group and the members are detected as moving from the outdoor premises to an inside of the store;
monitoring, by the executable instructions, any items acquired through image processing of other images captured for the group and the members by the indoor tracking system using the image attributes and sensor processing by the members in both indoor and outdoor areas associated with the store and the frictionless store; and
permitting, by the executable instructions, one member to elect to checkout from the store through payment for all the items acquired by the members by identification of the one member from the other images using the attributes.

14. The method of claim 13 further comprising, processing the executable instructions with the cameras that are located at a fuel station in both the indoor and outdoor areas.

15. The method of claim 13, wherein tracking further includes identifying through the image attributes and/or wireless/sensor communications with a device of the one member a registered account of the one member with the frictionless store without any affirmative action being required of the one member.

16. The method of claim 13, wherein permitting further includes permitting the one member to opt out of the potential group and checkout with just those items acquired by the one member in the indoor and/or outdoor areas.

17. The method of claim 16, wherein permitting further includes tracking each of remaining members individually for those items acquired by each of the remaining members ensuring that each of the remaining members perform a checkout at a self-service checkout for their items before existing the frictionless store.

18. A system, comprising:
a processor;
a non-transitory computer-readable storage medium having executable instructions;
the executable instructions when executed by the processor cause the processor to:
identify members of a group on an outdoor premises of a store by analyzing images captured by cameras and extract attributes for the group from the initial images, wherein the attributes include for each member include: a height of that member, a color of apparel worn by that member, facial features of that member, sex of that member, and ethnicity of that member;
link a registered account to a specific member of the group identified from the images using the attributes; and
provide the attributes for each member of the group and the group as a whole along with the registered account to an indoor tracking system of the store that tracks each member of the group from other images captured by cameras associated with the indoor tracking system, wherein at least a portion of a store includes a frictionless store that allows customers to pick specific items from the frictionless store without scanning the specific items for a checkout at the store.

19. The system of claim 16, wherein the executable instructions when executed by the hardware processor further cause the processor to:
identify the specific member based on registered image attributes associated with a vehicle of the specific member that is linked to the registered account or based on wireless information communicated from a device associated with the vehicle or a mobile device of the specific member.

* * * * *